(12) United States Patent
Whitt et al.

(10) Patent No.: US 6,851,007 B1
(45) Date of Patent: Feb. 1, 2005

(54) MULTI-CHANNEL INTERFACE CONTROLLER FOR ENABLING A HOST TO INTERFACE WITH ONE OR MORE HOST DEVICES

(75) Inventors: Jeffrey K. Whitt, Colorado Springs, CO (US); Debra O. Dillon, Littleton, CO (US)

(73) Assignee: LSI Logic Corporation, Milpitas, CA (US)

(*) Notice: Subject to any disclaimer, the term of this patent is extended or adjusted under 35 U.S.C. 154(b) by 477 days.

(21) Appl. No.: 09/870,136

(22) Filed: May 30, 2001

(51) Int. Cl.$^7$ .......................... G06F 13/00; G06F 12/00
(52) U.S. Cl. ...................... 710/305; 711/114
(58) Field of Search .......................... 710/305, 2, 105, 710/8, 300, 104, 315, 313; 709/226, 231, 301; 370/464; 340/2.2; 711/114

(56) References Cited

U.S. PATENT DOCUMENTS

| | | | | |
|---|---|---|---|---|
| 4,853,846 A | * | 8/1989 | Johnson et al. | 710/300 |
| 5,392,450 A | * | 2/1995 | Nossen | 455/12.1 |
| 5,557,778 A | * | 9/1996 | Vaillancourt | 340/825.02 |
| 5,761,460 A | * | 6/1998 | Santos et al. | 710/305 |
| 6,132,306 A | * | 10/2000 | Trompower | 455/11.1 |

* cited by examiner

Primary Examiner—Gopal C. Ray
(74) Attorney, Agent, or Firm—Suiter West PC LLO

(57) ABSTRACT

The present invention is directed to a multichannel interface controller. An interface controller may include a first channel and a second channel. The first channel and the second channel are suitable for providing an interface between a host and a host device, in which, the first channel is separately configurable from the second channel.

18 Claims, 4 Drawing Sheets

MULTI-CHANNEL INTERFACE CONTROLLER FOR ENABLING A HOST TO INTERFACE WITH ONE OR MORE HOST DEVICES

FIELD OF THE INVENTION

The present invention generally relates to the field of protocol control devices, and particularly to a multi-channel I/O protocol device.

BACKGROUND OF THE INVENTION

Information handling systems, such as desktop and portable computers, servers, Internet appliances, personal digital assistants, and the like, may communicate with other electronic devices for increased functionality. For example, a typical desktop computer may communicate with hard drives, printers, optical media readers, and the like. To communicate with these devices, typically, a controller was configured to comply with a standard to enable the devices to exchange information.

For instance, a Small Computer System Interface (SCSI) defines an input/output bus and logical interfaces supporting the bus of interconnecting computer and peripheral devices. This interface was developed as a standard interface for a variety of devices so that only a single adapter type was required, as opposed to previous interfaces that were configured for only a specific type of device, such as a hard disk interface for a hard disk drive, and the like. Thus, a device independent mechanism was achieved to attach and access devices to host computers that supports multiple devices, including one or more hosts. SCSI interfaces are available on a variety of systems, from desktop computers to minicomputers and supercomputers.

However, one host driver previously configured SCSI channels because multiple SCSI channels looked identical to an operating system. Thus, the operating system could not control which host driver controls which SCSI channel. Previously, to control which host driver controlled which SCSI channels, separate protocol controllers were necessary. Therefore, the complexity, space taken by the devices and cost of the information handling system increased.

Further, even with the availability of a SCSI interface, the need for expanded functionality in information handling systems may require a variety of protocols and interconnects for communicating with the wide variety of desired devices.

Therefore, it would be desirable to provide a multichannel interface controller.

SUMMARY OF THE INVENTION

Accordingly, the present invention is directed to a multichannel interface controller. In a first aspect of the present invention, an interface controller includes a first channel and a second channel. The first channel and the second channel are suitable for providing an interface between a host and a host device, in which, the first channel is separately configurable from the second channel.

In a second aspect of the present invention, an information handling system includes a host and an interface controller. The host includes a host processor suitable for performing a program of instructions, a host memory suitable for storing a program of instructions and a bus suitable for providing communication between the processor and the host memory. An interface controller is communicatively coupled to the bus. The interface controller includes a first channel and a second channel, both of which are suitable for providing an interface between the host and an electronic device. The first channel is separately configurable from the second channel.

In a third aspect of the present invention, a method of initiating an information handling system includes receiving a command to initiate an information handling system. A host BIOS of the information handling system is started, and the host BIOS initiates an interface controller BIOS. The interface controller BIOS is suitable for configuring a first channel of the interface controller and a second channel of the interface controller so that the first channel is separately configurable from the second channel.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
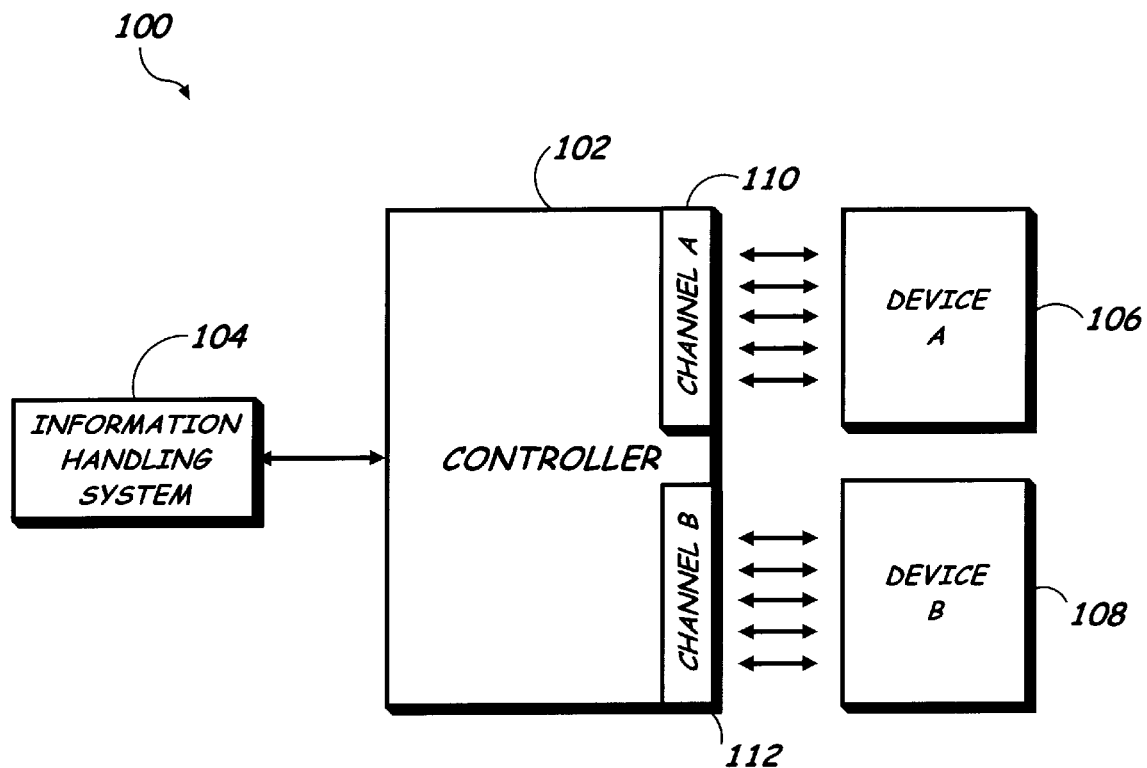
FIG. 1 is a block diagram of an exemplary embodiment of the present invention wherein an interface controller is included with an information handling system to enable the information handling system to communicate with a first device and a second device.

Reference will now be made in detail to the presently preferred embodiments of the invention, examples of which are illustrated in the accompanying drawings.

Referring generally now to FIGS. 1 through 4, exemplary embodiments of the present invention are shown. SCSI is a local input/output bus that may operate over a wide range of data rates. The SCSI specification allows for a number of different physical interconnect configurations which provide a wide range of geographic reach and data transfer speed, each of which are contemplated by the present invention. For example, configurations which utilize parallel copper wire interconnect schemes may utilize a bus length ranging from 1.5 meters to 25 meters and beyond, with data transfer range from 5 Mbytes per sec to 80 Mbytes per second and beyond. Additionally, serial optical interconnect schemes may be utilized, so that SCSI devices may be separated by a great distances, such as 3 kilometers with data transfer rates of 100 Mbytes per second and beyond.

The original SCSI specification described a bus that operated at up to 5 MHz. The 5 Mbytes per second rate is a computed rate (1 Byte per period×5 million transfer periods per second). However, while this data transfer rate was theoretically achievable, the actual rate was not achieved in practice due to a number of reasons, which include the following: (1) The specification allows transfer rate below the target rate, and since the rate used is defined by the slower of two devices, a lower rate may be utilized. (2) SCSI data maybe transferred in an asynchronous manner. (3) Data is not transferred during periods needed to set up a connection (operation overhead).

The SCSI standard supports single ended and differential interface configurations. A single ended interface was typically utilized in instances wherein fewer wires or less complex chips were desired to support the SCSI bus than in a differential interface. The utilization of fewer wires allowed for smaller connectors and less cost. However, these characteristics restricted the placement of devices as well as the total length of a single ended bus to a maximum of 6 meters. Differential interfaces may be designed to span distances of up to 25 meters, which make them particularly well suited for use as an external connection between a host and a peripheral subsystem.

Additional SCSI specifications were developed to increase performance, improve compatibility, increase the number of addressable devices and improve functionality. The SCSI-2 specification allows the bus to be widened from 8-bits, to 16 bits (two-byte) or 32 bits (four-byte) wide. However, typically, 16 bit wide buses are implemented. The term "Wide" is typically utilized to refer a 16 bit (2 byte) bus, while the term "Narrow" is most often used to refer to an 8 bit wide bus. The term "Fast" is typically utilized to refer to a 10 Mbytes per second bus. Therefore, SCSI buses may include Fast SCSI, Wide SCSI and Fast Wide SCSI. A Fast SCSI bus is 8 bits in width, supports 8 devices, and has a maximum data transfer rate of 10 Mbytes per second (8 bits×10 million data transfer cycles per second). A Wide SCSI bus is 16 bits wide, supports 16 devices and has a maximum data transfer rate of 10 Mbytes per second (16 bits×5 million data transfer cycles per second). A Fast Wide SCSI bus is 16 bits in width, supports 16 devices and has a maximum data transfer rate of 20 Mbytes per second (16 bits×10 million data transfer cycles per second). Additional data transfer cycles may also be achieved utilizing "Ultra", 20 MHz, and "Ultra 2", 40 MHz.

Further, Low Voltage Differential (LVD) may be utilized to support Ultra 2 rates at increased distances, such as up to 12 meters, over Ultra, which is limited to 3 meters in single-ended configurations and 25 meters in differential configurations. LVD may also be utilized to support Fast, Wide, Ultra, and the like, at distances up to 12 meters.

Referring now to FIG. 1, an exemplary embodiment 100 of the present invention wherein a controller is suitable for multiple channel operation. An interface controller 102 is suitable for interfacing an information handling system 104 with a plurality of devices, such as device A 106 and device B 108. For example, the interface controller 102 may be configured to support a first channel, channel A 110 and a second channel, channel B 112. Typically, both channels were configured by one host driver because both channels look identical to an operating system. However, by utilizing the present invention, the first channel may be configured separately from the second channel, so as to allow an operating system to provide resources appropriately.

Figure 2:
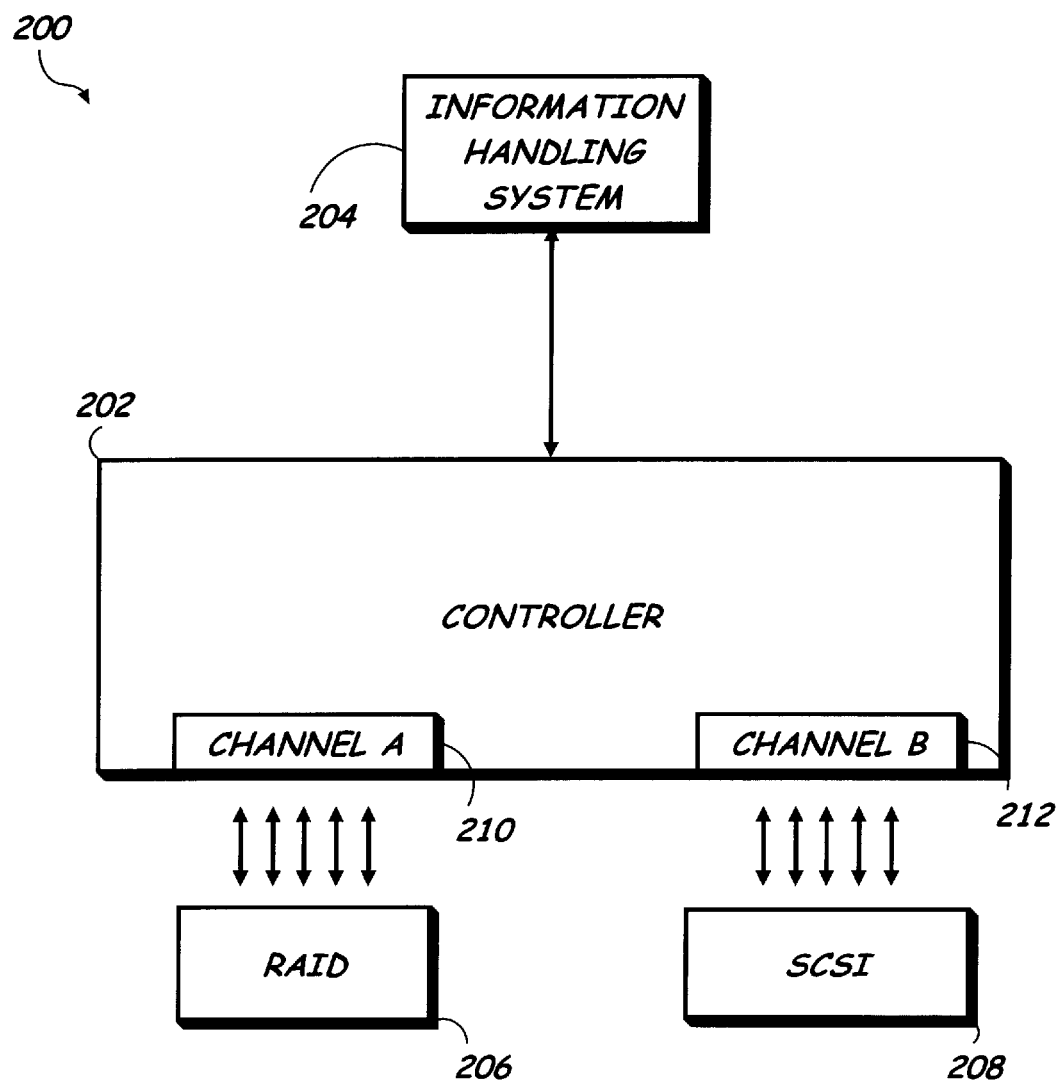
FIG. 2 is a block diagram depicting an embodiment of the present invention wherein an interface controller is suitable for providing an interface including separate configurable channels wherein a first channel is suitable for supporting a RAID driver and the second channel is suitable for providing a SCSI interface.

For example, as shown in the embodiment 200 depicted in FIG. 2, an interface controller is suitable for providing an interface including separate configurable channels wherein a first channel is suitable for supporting a RAID driver and the second channel is suitable for providing a legacy SCSI interface. An interface controller 202 is configured to provide an interface between an information handling system 204, a RAID device 206, and a SCSI device 208. The interface controller 202 includes a first channel, channel A 210, which is separately configurable from a second channel, channel B 212. Thus, each channel in the controller may be configured separately so that an operating system can provide resources appropriately, i.e. which host driver controls which channel. For instance, an operating system may operate channel A 210 with a first host driver to provide RAID functionality, and may operate channel B 212 with a second host driver to provide a SCSI interface. In this way, a system of hardware hooks may enable software, such as on the operating system side, to distinguish and configure each channel independently from one another.

Figure 3:
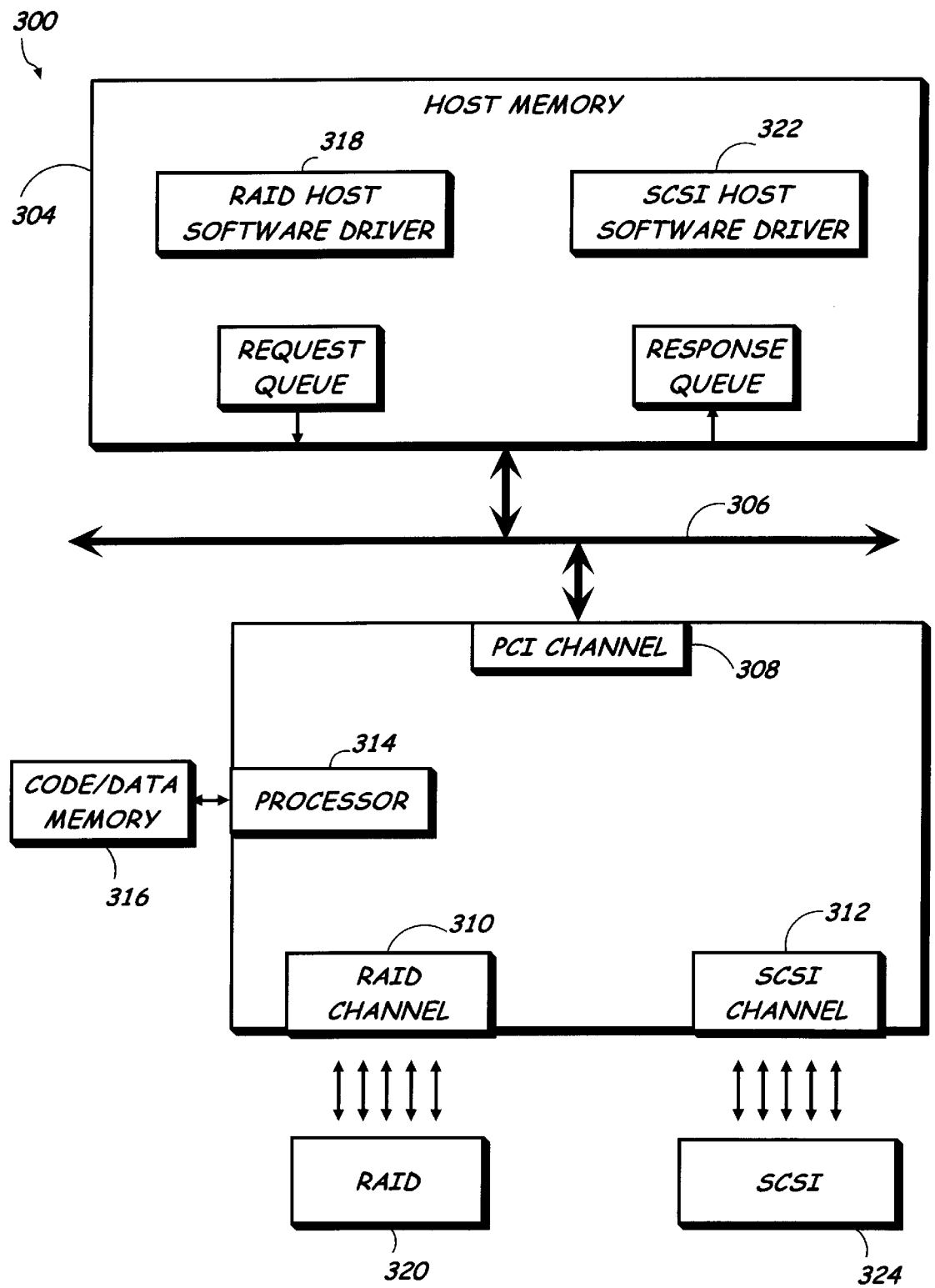
FIG. 3 is a block diagram depicting an embodiment of the present invention wherein an interface controller coupled to host memory provides a first host software driver for a first channel and a second host software drive to operate a second channel.

Referring now to FIG. 3, an exemplary system 300 suitable for utilization of the present invention is shown wherein an interface controller coupled to host memory provides a first host software driver for operating a first channel and a second host software drive for operating a second channel. An interface controller 302 is coupled to host memory 304 of an information handling system over a bus 306, such as a PCI bus and the like. The interface controller includes a PCI channel interface device 308 for communicatively coupling the interface controller 302 to the bus 306, such as to facilitate transfer of data between the host memory 304 and the interface controller 302. SCSI channel interface devices 310 and 312 are also provided to communicate over a SCSI compliant interface with a variety of devices, such as hard drives, disk arrays, optical media devices, and the like. The SCSI channel interface devices 310 and 312 may provide autonomous SCSI interfaces capable of handling complete SCSI operation, and the like. A processor 314, such as a RISC processor, is also included, which may function to handle complete I/O transactions without intervention from a host, although host intervention is also contemplated by the present invention. The processor 314 may include code and data memory 316, either "on" or "off chip", such as firmware, to configure the interface controller 302 for separate control of the included channels. Consequently, in the present embodiment, hardware and software are provided to allow support of a RAID channel and a legacy channel in the same device, so as to reduce cost and space in a computing system.

Therefore, by utilizing the present invention, host memory 304 may include a first software driver for interfacing with a first channel of the interface controller and a second software drive for interfacing with a second channel of the interface controller. For instance, a raid host software driver 318 may be provided for interfacing with a RAID device 320 over a separately configurable RAID channel 310. Additionally, a SCSI host software driver 322 may be provided for interfacing with a SCSI compliant device 324 over a SCSI channel 312. Preferably, the configuration of the interface controller of the present invention is realized by firmware internal to the interface controller. For instance, the firmware may configure each channel before an Operating System device discovery phase, to enable full programmability in the internal firmware.

Figure 4:
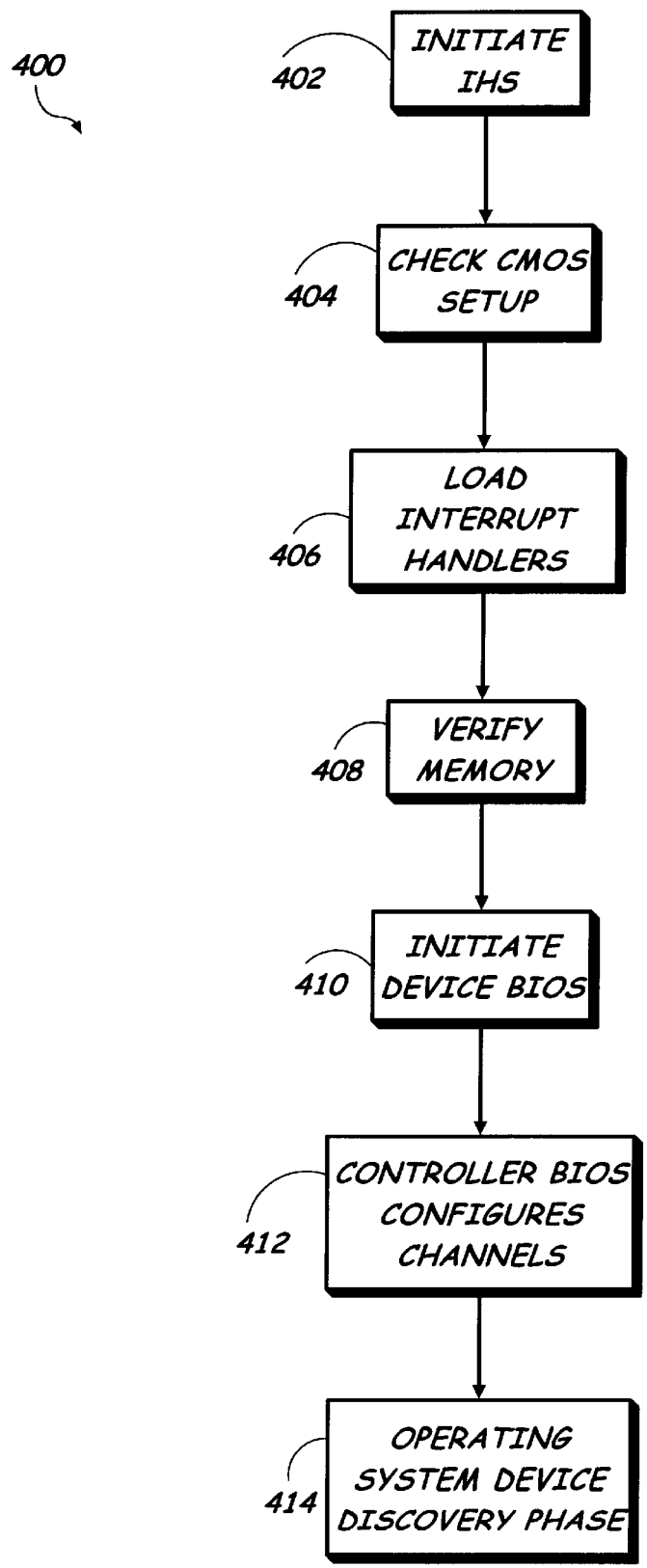
FIG. 4 is a flow diagram illustrating an exemplary method of the present invention wherein an interface controller may be configured to include channels before an Operating System Device discovery phase is entered.

For example, referring now to the exemplary method 400 of the present invention as depicted in FIG. 4, an interface controller may be configured to include channels before an Operating System Device discovery phase is entered. An information handling system, such as a server, desktop computer, laptop, digital information appliance, Internet appliance, and the like, is initiated 402. A complementary metal oxide semiconductor (CMOS) chip is accessed 404 to gain particular information to modify and/or supplement default programming of the information handling system as needed. Interrupt handlers, portions of software which are utilized as a translator between hardware components of the information handling system and the operating system, are loaded 406. A video card, if included in the information handling system, may also be checked.

Memory may then be verified 408. For example, a BIOS may check if the initiation of the information handling system is a "cold" or "warm" boot. If it is a warm boot, the rest of the power on self-test (POST) is skipped. However, if it is a cold boot, BIOS verifies memory 408 by performing a read/write test of each memory address, checks available ports and input devices, checks components, such as components connected to a PCI bus, and the like.

Next, the Interface Controller is initiated 410 so that interface controller BIOS configures channels 412 of the Interface controller to be separately accessible and configurable by an operating system. Thus, when during an operating system device discovery phase 414, the separately configurable channels of the interface controller of the present invention will be available and discoverable by the operating system.

It is believed that the multiple channel interface controller of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An interface controller, comprising:
   a first channel controlled by a redundant array of independent disks (RAID) driver, the first channel suitable for providing an interface between a host and a first host device; and
   a second channel controlled by a small computer system interface (SCSI) driver, the second channel suitable for providing an interface between the host and a second host device,
   wherein the first channel is separately configurable from the second channel.

2. The interface controller as described in claim 1, wherein the interface controller complies with a small computer system interface (SCSI) format.

3. The interface controller as described in claim 1, wherein a program of instructions configures the first channel and the second channel before an operating system device discovery phase.

4. The interface controller as described in claim 3, wherein the program of instructions includes firmware internal to the interface controller.

5. The interface controller as described in claim 1, further comprising a processor internal to the interface controller, wherein the processor configures the first channel and the second channel utilizing firmware internal to the interface controller.

6. The interface controller as described in claim 1, further comprising a processor internal to the interface controller, wherein the processor configures the first channel and the second channel utilizing firmware external to the interface controller.

7. An information handling system, comprising:
   a host including
      a processor suitable for performing a program of instructions,
      a host memory, the host memory suitable for storing a program of instructions; and
      a bus suitable for providing communication between the processor and the host memory; and
   an interface controller communicatively coupled to the bus, wherein the interface controller includes
      a first channel controlled by a redundant array of independent disks (RAID) driver, the first channel suitable for providing an interface between the host and a first electronic device; and
      a second channel controlled by a small computer system interface (SCSI) driver, the second channel suitable for providing an interface between the host and a second electronic device, wherein the first channel is separately configurable from the second channel.

8. The information handling system as described in claim 7, wherein the interface controller complies with a small computer system interface (SCSI) format.

9. The information handling system as described in claim 7, wherein a program of instructions configures the first channel and the second channel of the interface controller before an operating system device discovery phase of the host.

10. The information handling system as described in claim 9, wherein the program of instructions includes firmware internal to the interface controller.

11. The information handling system as described in claim 7, further comprising a processor internal to the interface controller, wherein the processor configures the first channel and the second channel utilizing firmware internal to the interface controller.

12. The information handling system as described in claim 7, further comprising a processor internal to the interface controller, wherein the processor configures the first channel and the second channel utilizing firmware external to the interface controller.

13. A method of initiating an information handling system, comprising:
   receiving a command to initiate an information handling system;
   starting a host BIOS of the information handling system; and
   initiating an interface controller BIOS, the interface controller BIOS suitable for configuring a first channel of the interface controller and a second channel of the interface controller so that the first channel is separately configurable from the second channel;
   initiating a first device driver from a memory of the information handling system, the first device driver for controlling the operation of the first channel; and
   initiating a second device driver from the memory of the information handling system, the second device driver for controlling the operation of the second channel.

14. The method as described in claim 13, wherein the first device driver is a redundant array of independent disks (RAID) driver and the second device driver is a small computer system interface (SCSI) driver.

15. The method as described in claim 13, wherein the first channel is separately configurable from the second channel before an operating system device discovery phase of an operating system is loaded by the information handling system.

16. The method as described in claim 13, wherein the information handling system includes an interface controller for executing the interface controller BIOS.

17. The method as described in claim 16, further comprising a processor internal to the interface controller, wherein the processor configures the first channel and the second channel utilizing firmware internal to the interface controller.

18. The method as described in claim 16, further comprising a processor internal to the interface controller, wherein the processor configures the first channel and the second channel utilizing firmware external to the interface controller.

* * * * *